D. A. REES.
Car-Brake.
No. 207,819. Patented Sept. 10, 1878.
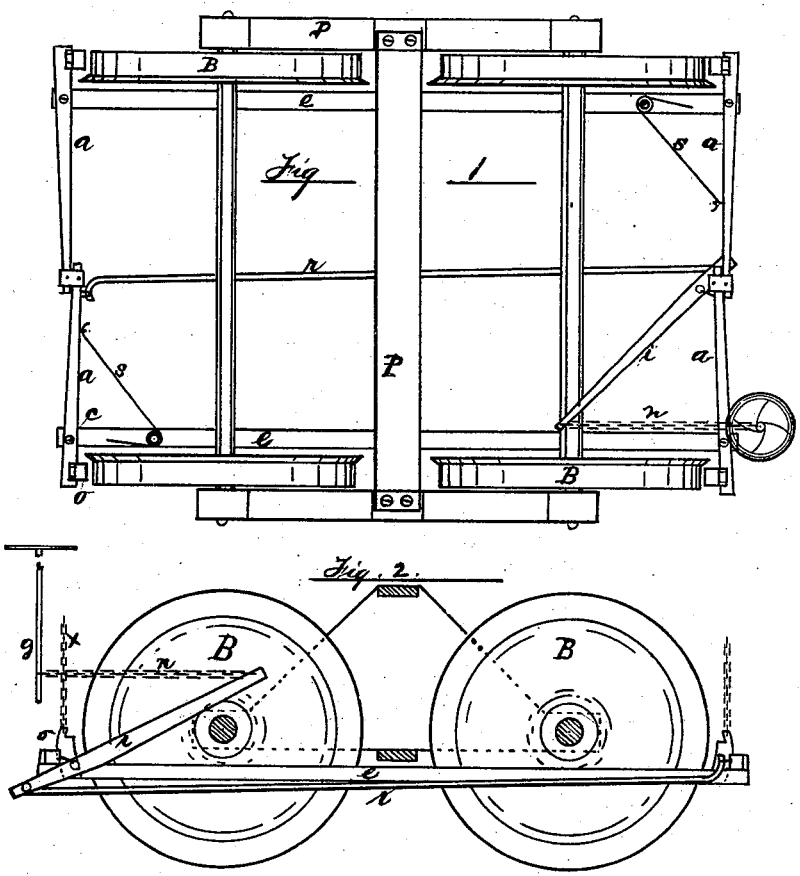
Witnesses
Thos H. Hutchins
Wm J Hutchins
Inventor
Darius A. Rees

UNITED STATES PATENT OFFICE.

DARIUS A. REES, OF JOLIET, ILLINOIS.

IMPROVEMENT IN CAR-BRAKES.

Specification forming part of Letters Patent No. 207,819, dated September 10, 1878; application filed February 4, 1878.

*To all whom it may concern:*

Be it known that I, DARIUS A. REES, of the city of Joliet, in Will county, and State of Illinois, have invented certain Improvements in Car-Brakes, the construction and operation of which I will proceed to explain, reference being had to the annexed drawings, making a part of this specification, in which—

Figure 1 is a plan view on the top, and Fig. 2 a longitudinal section through the center.

The nature and object of the invention are to furnish an effectual, easy, and cheap way of braking cars, and to so construct the brake that it can be easily applied to any car-truck.

In the drawings, P represents the main frame of the truck, supported by the wheels B in the ordinary manner. To the under side of the main frame of the truck is fastened permanently, near the wheels, at either side, a beam, e, running the entire length of the truck to the outer side of the wheels, as shown in Fig. 1. To the outer ends of the beams e are attached the levers a, one at each end of each beam e, as is shown in said Fig. 1, so arranged that the beams e act as the fulcrum to each lever a. The two long arms of each pair of levers a meet at the center of the truck, midway between the wheels, and are connected together by means of a joint, as shown, to admit of free play. The levers a are operated and caused to engage their short arms against the periphery of the wheels by means of the long rod r and lever i, the rod r connecting the two pairs of levers at the center of the truck, as shown in Fig. 1.

It will be observed that as the chain n is wound up on the rod g the rod r presses the long arms of the levers a apart, and causes the short arms to engage with the periphery of the wheels with such great force as to cause the wheels to slide on the track, thus furnishing a most powerful and simple brake.

The springs s are used to disengage the brake from the wheel when not in use, and the chain x is used to support the levers and brake from the car above or from the frame of the truck.

Having thus described my invention, what I claim as new, and desire to secure by Letters Patent, is as follows, to wit:

The combination and arrangement of the levers a and i, connecting-rod r, springs s, chains n and x, beams e, and main frame P, as and for the purpose set forth.

DARIUS A. REES.

Witnesses:
 THOS. H. HUTCHINS,
 WM. J. HUTCHINS.